US008620367B2

(12) United States Patent
Jeong et al.

(10) Patent No.: US 8,620,367 B2
(45) Date of Patent: Dec. 31, 2013

(54) APPARATUS AND METHOD FOR MANAGING A RANDOM ACCESS CHANNEL IN A MOBILE COMMUNICATION SYSTEM

(75) Inventors: Kyeong In Jeong, Hwaseong-si (KR); Lixiang Xu, Beijing (CN); Gert Jan Van Lieshout, Staines Middlesex (GB)

(73) Assignee: Samsung Electronics Co., Ltd. (KR)

( * ) Notice: Subject to any disclaimer, the term of this patent is extended or adjusted under 35 U.S.C. 154(b) by 403 days.

(21) Appl. No.: 12/770,237

(22) Filed: Apr. 29, 2010

(65) Prior Publication Data

US 2010/0278131 A1 Nov. 4, 2010

(30) Foreign Application Priority Data

Apr. 29, 2009 (KR) ........................ 10-2009-0037880

(51) Int. Cl.
*H04B 7/00* (2006.01)
*H04B 17/00* (2006.01)
*H04B 15/00* (2006.01)
*H04B 7/212* (2006.01)
*H04W 72/00* (2009.01)
*H04W 36/00* (2009.01)
*H04W 4/00* (2009.01)
*H04L 12/413* (2006.01)
*H04J 1/16* (2006.01)
*H04M 15/00* (2006.01)
*H04M 7/00* (2006.01)

(52) U.S. Cl.
USPC ........ 455/509; 455/67.11; 455/436; 455/450; 455/502; 370/216; 370/241; 370/242; 370/252; 370/329; 370/442; 370/445; 379/112.05; 379/221.03

(58) Field of Classification Search
USPC ........... 455/67.11, 436, 502, 509, 7; 370/216, 370/235, 242, 252, 431, 442, 447, 514, 230, 370/236.2, 237, 241, 248, 352, 445, 329; 375/150, 152, 229, 368; 379/112.05, 379/221.03
See application file for complete search history.

(56) References Cited

U.S. PATENT DOCUMENTS

| | | | |
|---|---|---|---|
| 2003/0223452 A1* | 12/2003 | Toskala et al. | 370/442 |
| 2008/0132207 A1* | 6/2008 | Gallagher et al. | 455/411 |
| 2009/0186624 A1* | 7/2009 | Cave et al. | 455/450 |
| 2010/0124188 A1* | 5/2010 | Wu | 370/328 |
| 2010/0203915 A1* | 8/2010 | Baker et al. | 455/509 |
| 2011/0205908 A1* | 8/2011 | Yi et al. | 370/242 |

OTHER PUBLICATIONS

3rd Generation Partnership Project; Technical Specification Group Radio Access Network; Evolved Universal Terrestrial Radio Access (E-UTRA).
Radio Resource Control (RRC); Protocol Specification (Release 9), 3GPP TS 36.331 V9.1.0, Dec. 2009.

\* cited by examiner

*Primary Examiner* — Inder Mehra
(74) *Attorney, Agent, or Firm* — The Farrell Law Firm, P.C.

(57) ABSTRACT

An apparatus and method for managing a Random Access CHannel (RACH) in a mobile communication system, in which a User Equipment (UE) receives a UE information transmit request for a RACH procedure from a network, and transmits, to the network, a message including information indicating a contention detected in the RACH procedure.

22 Claims, 8 Drawing Sheets

US 8,620,367 B2

APPARATUS AND METHOD FOR MANAGING A RANDOM ACCESS CHANNEL IN A MOBILE COMMUNICATION SYSTEM

PRIORITY

This application claims priority under 35 U.S.C. §119(a) to a Korean Patent Application filed in the Korean Intellectual Property Office on Apr. 29, 2009 and assigned Serial No. 10-2009-0037880, the entire disclosure of which is hereby incorporated by reference.

BACKGROUND OF THE INVENTION

1. Field of the Invention

The present invention relates generally to a mobile communication system, and more particularly, to an apparatus and method for managing a Random Access CHannel (RACH) in a mobile communication system.

2. Description of the Related Art

Long Term Evolution (LTE), which is the next-generation mobile communication system of Universal Mobile Telecommunication Service (UMTS) or the third generation mobile communication system, provides high-speed packet services based on Orthogonal Frequency Division Multiplexing (OFDM).

FIG. 1 illustrates an LTE mobile communication system.

Referring to FIG. 1, the LTE system has been simplified in a 2-node structure including Evolved Node Bs (ENBs) 120, 122, 124, 126 and 128, and anchor nodes 130 and 132. A User Equipment (UE) 101 accesses an Internet Protocol (IP) network using the ENBs and the anchor nodes. The ENBs are connected to the UE 101 by radio channels, and manage their cells and control radio resources.

For example, an ENB generates control information necessary in the cell(s) as system information, broadcasts the system information, allocates radio resources to exchange data and/or control information with UEs, and decides and performs a handover by acquiring, from UEs, channel measurement information of the current cell and adjacent cells. The ENB includes control protocols such as a Radio Resource Control (RRC) associated with radio resource management.

However, a more efficient random access procedure would greatly benefit the next-generation mobile communication system. In particular, the next-generation mobile communication system is still lacking a scheme that efficiently allocates random access resources considering collisions or contentions between random access preambles, which are simultaneously transmitted from multiple UEs.

SUMMARY OF THE INVENTION

Accordingly, the present invention is designed to address at least the above-mentioned problems and/or disadvantages and to provide at least the advantages as will be described below. An aspect of the present invention provides an apparatus and method for optimizing random access-related system resources by a network in a mobile communication system.

Another aspect of the present invention provides an apparatus and method for efficiently managing RACHs by a network in a mobile communication system.

Another aspect of the present invention provides an apparatus and method for setting random access preambles and resources by a network on an optimized basis in a mobile communication system.

Another aspect of the present invention provides an apparatus and method for setting/resetting random access resources considering RACH preamble collisions by a network in a mobile communication system.

Another aspect of the present invention provides an apparatus and method for automatically adjusting random access resources to be allocated considering RACH preamble collisions by a network in a mobile communication system.

Another aspect of the present invention provides an apparatus and method, wherein a network transmits, to UEs, random access parameters that have been set considering RACH preamble collisions in a mobile communication system.

Another aspect of the present invention provides an apparatus and method, wherein UEs report RACH preamble collision count and time information to a network in a mobile communication system.

Another aspect of the present invention provides an apparatus and method, wherein UEs receive, from a network, parameters that were set considering RACH preamble collisions in a mobile communication system.

In accordance with an aspect of the present invention, there is provided a RACH management method performed by a UE in a mobile communication system. The method includes receiving a UE information transmit request for a RACH procedure from a network, and transmitting a message including information indicating a contention detected in the RACH procedure, to the network.

In accordance with another aspect of the present invention, there is provided a method for managing a RACH by a network in a mobile communication system. The method includes transmitting a UE information transmit request for a RACH procedure, to a UE, and receiving, from the UE, a message including information indicating a contention detected in the RACH procedure.

In accordance with another aspect of the present invention, there is provided a UE apparatus using a RACH in a mobile communication system. The apparatus includes a receiver for receiving a UE information transmit request for a RACH procedure from a network, and a transmitter for transmitting a message including information indicating a contention detected in the RACH procedure, to the network.

In accordance with another aspect of the present invention, there is provided a network apparatus for managing a RACH in a mobile communication system. The apparatus includes a transmitter for transmitting a UE information transmit request for a RACH procedure, to a UE, and a receiver for receiving from the UE a message including information indicating a contention detected in the RACH procedure.

In accordance with another aspect of the present invention, there is provided a mobile communication system using a RACH. The system includes a network entity for transmitting a UE information transmit request for a RACH procedure to a UE, and receiving from the UE a message including information indicating a contention detected in the RACH procedure, and the UE for receiving the UE information transmit request for the RACH procedure from the network entity, and transmitting the message including the information indicating the contention detected in the RACH procedure, to the network entity.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, descriptions of well-known functions and constructions are omitted for clarity and conciseness. In addition, terms used herein are defined based on functions in the present invention and may vary according to users, operator intentions or usual practices. Therefore, the definition of the terms should be made based on contents throughout the specification.

While the present invention will be described using, for example, a 3$^{rd}$ Generation Partnership Project (3GPP) Long Term Evolution (LTE) system that has evolved from the 3GPP system, the present invention is applicable to all mobile communication systems to which ENB scheduling is applied, without any modification. In addition, the present invention is applicable to communication systems to which a random access procedure is applied. Additionally, the present invention is applicable to systems supporting uplink services.

As will be described below, a mobile communication system according to an embodiment of the present invention automatically optimizes preambles and system resources regarding Radom Access CHannels (RACH). In particular, a method for automatically optimizing numberOfRA-Preambles, sizeOfRA-PreamblesGroupA and/or parach-Config-Index among RACH-related system resources is provided.

The numberOfRA-Preambles indicates information about the number of preambles used for a contention-based RACH, and the sizeOfRA-PreamblesGroupA indicates information about the number of preambles belonging to a preamble group A among a number of preambles used for the contention-based RACH. The number of preambles belonging to a preamble group B may be represented by numberOfRA-Preambles minus sizeOfRA-PreamblesGroupA. The parach-ConfigIndex indicates the number of RACH resources (times and frequencies) allocated for each radio frame.

In a mobile communication system according to an embodiment of the present invention, a network includes an ENB and a Self-Optimized Network (SON) server. To automatically optimize the RACH parameters in the network, a UE records the number of preamble collisions (or a preamble collision count) and each preamble collision's time until a RACH procedure is successfully performed or until the RACH procedure fails, and then reports them to the network after completion of the RACH procedure or upon receipt of a request from the network.

Figure 1:
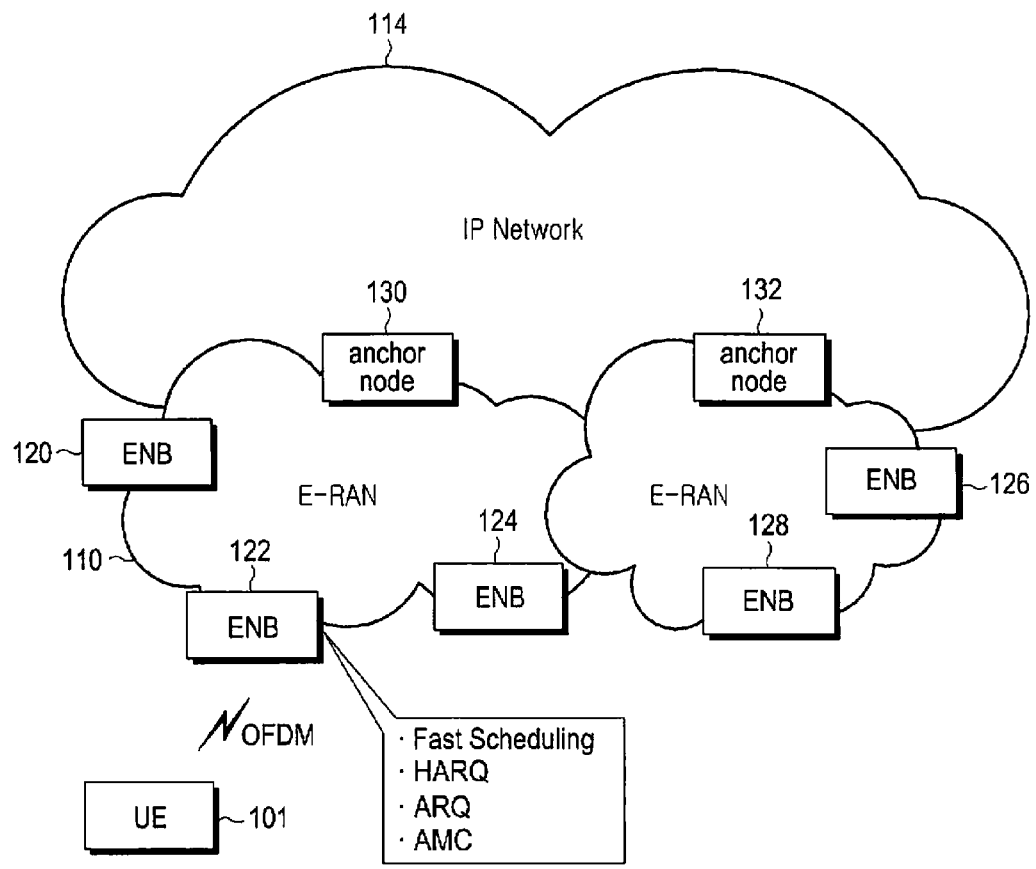
FIG. 1 is a diagram illustrating a next-generation mobile communication system.
Figure 2:
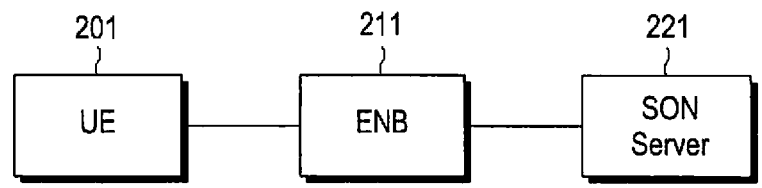
FIG. 2 is a diagram illustrating a conventional network structure.

FIG. 2 illustrates a conventional LTE system including a network server supporting automatic optimization.

A Self-Optimized Network (SON) refers to a network that automatically optimizes (or self-optimizes) system resources and related parameters of a cell. That is, without the network test that an operator staff directly performs, the network automatically optimizes system resources and related parameters, needed for data transmission that it has been reported from UEs, or based on the statistical figures obtained through the measurement by the network itself.

Referring to FIG. 2, a UE 201 and an ENB 211 exchange data and control information through a radio interface. A SON server 221 may determine policies appropriate for the ENB 211 and system resources and related parameters of the cell by receiving a report on the statistical figures from the ENB 211. Some system resources and related parameters may undergo a self-optimization operation in the ENB 211 itself, with the SON server 221 excluded.

Figure 3:
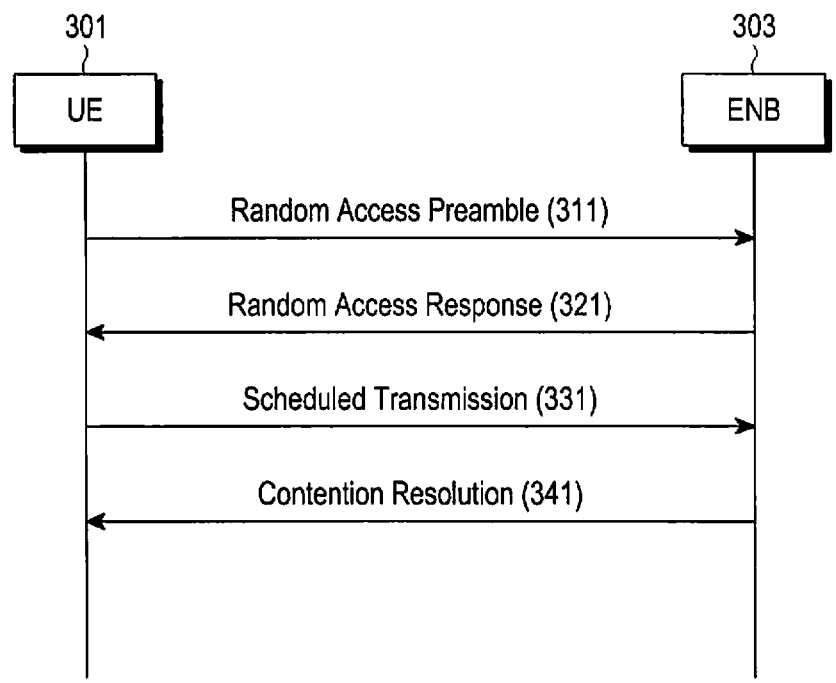
FIG. 3 is a signal flow diagram illustrating a conventional RACH procedure.

FIG. 3 illustrates a conventional RACH procedure in an LTE system.

Referring to FIG. 3, a UE 301 selects a preamble group, randomly selects a preamble in the selected group, and transmits the preamble to the ENB 303 through predefined RACH resources in step 311. The rule in which the UE 301 selects a preamble group may follow, for example, the 3GPP standard TS36.321v8.4.0. Generally, the UE 301 selects a preamble group depending on the current channel state and the size of a message to be transmitted.

The ENB 303, which has received the preamble in step 311, transmits received preamble's ID information, Timing Advanced (TA) information for adjusting uplink timing, uplink resource allocation information for message transmission by the UE 301, temporary UE ID information (or Temporary-Radio Network Temporary Identifier T-RNTI), etc., in step 321.

During uplink resource allocation, the ENB 303 may allocate different uplink resources for each group depending on the preamble group to which the preamble received in step 311 belongs. For example, supposing that a 'messageSize-GroupA' value, or a related parameter, is now b56, and is being broadcast through system information, if the received preamble belongs to a preamble group A, uplink resources sufficient for transmitting 56 bits are allocated. However, if the received preamble belongs to a preamble group B, uplink resources sufficient for transmitting more than 56-bit information may be allocated.

Upon receiving the uplink resource allocation information in step 321, the UE 301 determines whether or not the preamble transmitted in step 311 corresponds with the preamble ID received in step 321, and if it does correspond, transmits a Layer 2 (L2)/Layer 3 (L3) message using the uplink resources allocated in step 321, in step 331.

If multiple UEs have used the same preamble in step 311, a collision or a contention may occur. In order to clearly indicate the UE, transmission data from which the ENB 303 has received, the ENB 303 then transmits a UE's unique ID information (or Serving Temporary Mobile Subscriber Identity (S-TMSI)) received in step 331 or a contention resolution message with random ID information in step 341.

Therefore, multiple UEs that used the same preamble in step 311, receive the contention resolution message in step 341, and check if the UE's unique ID information or random ID information included in the message received in step 341 corresponds to the values transmitted in step 331. If corresponding, the UEs continue to a next procedure. However, if the UE's unique ID information or random ID information included in the message received in step 341 is different from the values the UEs transmitted in step 331, the UEs resume the RACH procedure.

Media Access Control (MAC) system parameters that the LTE system broadcasts regarding RACH are defined in Table 1 as follows. For more details on these parameters, reference can be made to the 3GPP standards TS36.331v8.4.0 and TS36.321v8.4.0.

TABLE 1

| RACH-ConfigCommon | |
|---|---|
| preambleInfo | |
| > numberOfRA-Preambles | ENUM {n4, n8, n12, n16, n20, n24, n28, n32, n36, n40, n44, n48, n52, n56, n60, n64} |
| > preamblesGroupAConfig | |
| >> sizeOfRA-PreamblesGroupA | ENUM {n4, n8, n12, n16, n20, n24, n28, n32, n36, n40, n44, n48, n52, n56, n60, spare1} |
| >> messageSizeGroupA | ENUM {b56, b144, b208, spare1} |
| >> messagePowerOffsetGroupB | ENUM {minusinfinity, spare1} |
| powerRampingParameters | |
| > powerRampingStep | ENUM {dB0, dB2, dB4, dB6} |
| > preambleInitialReceivedTargetPower | ENUM {dBm-120, dBm-118, dBm-116, dBm-114, dBm-112, dBm-110, dBm-108, dBm-106, dBm-104, dBm-102, dBm-100, dBm-98, dBm-96, dBm-94, dBm-92, dBm-90} |
| ra-SupervisionInfo | |
| > preambleTransMax | ENUM {n3, n4, n5, n6, n7, n8, n10, n20, n50, n100, n200, spare5, spare4, spare3, spare2, spare1} |
| > ra-ResponseWindowSize | ENUM {sf2, sf3, sf4, sf5, sf6, sf7, sf8, sf10} |
| > mac-ContentionResolutionTimer | ENUM {sf8, sf16, sf24, sf32, sf40, sf48, sf56, sf64} |
| maxHARQ-Msg3Tx | INT (1..8) |

PHYsical (PHY) system parameters that the LTE system broadcasts regarding RACH are defined in Table 2 as follows. For more details on these parameters, reference can be made to the 3GPP standards TS36.331 and TS36.211.

TABLE 2

| PRACH-ConfigSIB | |
|---|---|
| rootSequenceIndex | INT (0 ... 837) |
| prach-ConfigInfo | |
| > prach-ConfigIndex | INT (0 ... 63) |
| > highSpeedFlag | BOOLEAN |
| > zeroCorrelationZoneConfig | ENUM {0 ... 15} |
| > prach-FreqOffset | INT (0 ... 94) |

Although, in FIG. 3, the UE 301 is notified in step 321 of the preamble ID indicating the preamble it selected/transmitted in step 311 (the scheduling information for step 321 is transmitted through a Physical Downlink Common Control Channel (PDCCH) specific to Random Access Radio Network Temporary Id (RA-RNTI) (UE's unique ID information for random access) mapped to the RACH resource the UE used in step 311), if the UE fails to receive UE's unique ID information (S-TMSI) or random number information it transmitted in step 331 through the message of step 341 before a preamble contention resolution timer expires (the preamble contention resolution timer starts if the message of step 331 is transmitted), or if the UE is an RRC-connected UE and fails to receive UE-specific scheduling information through a PDCCH specific to a Cell Radio Network Temporary Identifier (C-RNTI) the UE uses, then the UE, regarding this as a preamble collision, increases the preamble collision count by 1 every time the preamble collision occurs, and records a time of each preamble collision, until successful RACH is completed or until the UE senses a RACH failure.

The preamble collision count and the time information of each preamble collision are reported to the network along with a cell ID with which the RACH has been performed, after completion of successful RACH or upon receipt of a request from the network.

Upon receiving the above information from the UE, the network calculates a preamble collision probability statistic value using a ratio of the preamble collision count to the number of received preambles for a particular time, and allocates the number of preambles and the number of RACH resources to be used for the contention-based RACH by matching the preamble collision probability statistic value to a target preamble collision probability value.

For example, if the preamble collision probability statistic value calculated based on the ratio of the preamble collision count to the number of received preambles for a particular time is now 5%, the number of preambles or the number of RACH resources to be used for the contention-based RACH is increased to maintain the preamble collision probability statistic value at the target preamble collision probability value (e.g., 1%). In the present invention, preambles in which numberOfRA-Preambles and sizeOfRA-PreamblesGroupA appear are also referred to as preambles.

Regarding the automatic adjustment of the parameters in the network, the ENB may perform the overall adjustment. Otherwise, the ENB may generate a statistic value by collecting information from UEs and report the generated statistic value to a SON server, and the SON server may determine parameter values and notify the ENB of the determined parameter values.

Figure 4A:
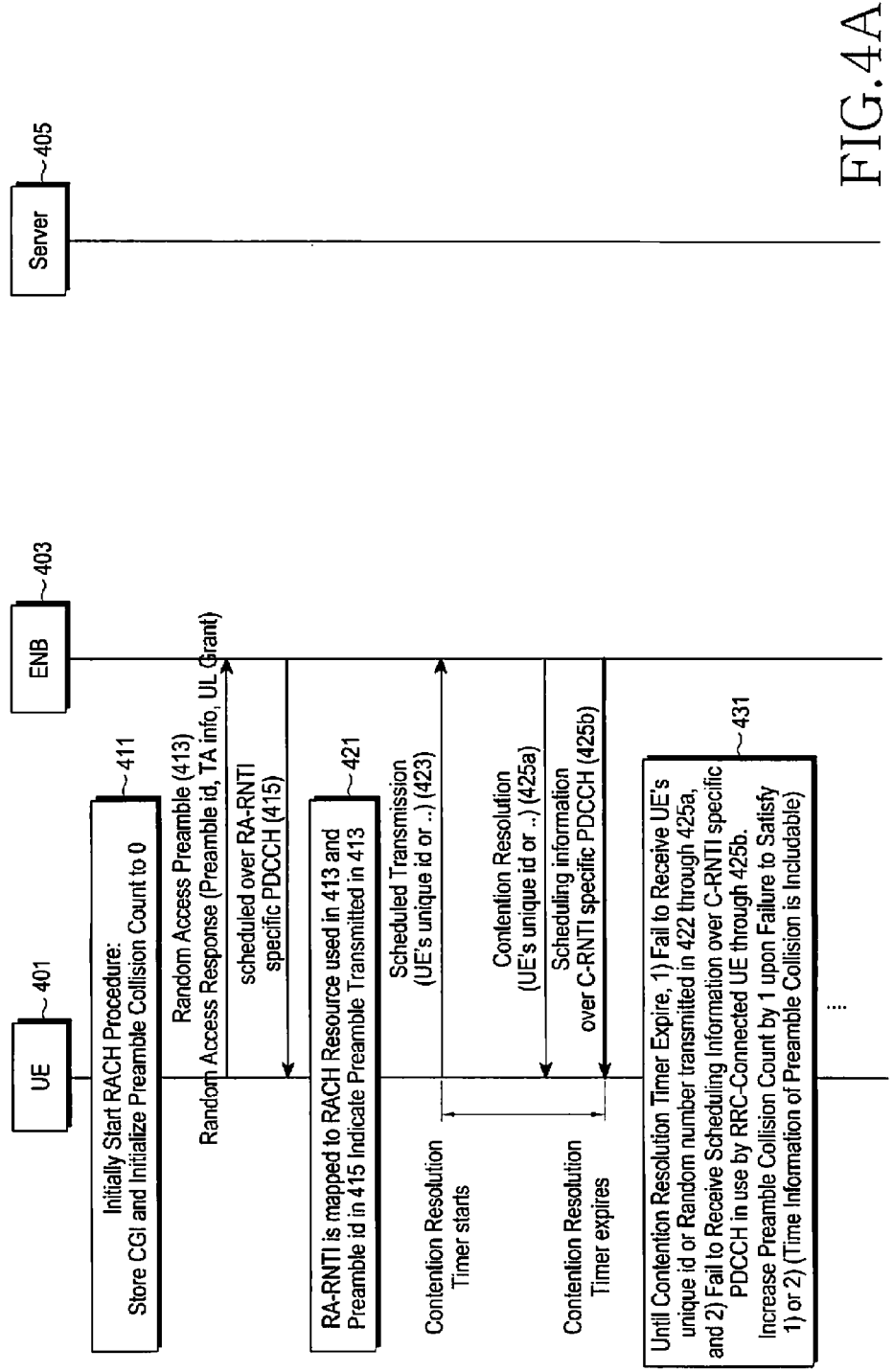
FIGS. 4A and 4B are signal flow diagrams illustrating an automatic optimization method for RACH-related system resources according to an embodiment of the present invention.
Figure 4B:
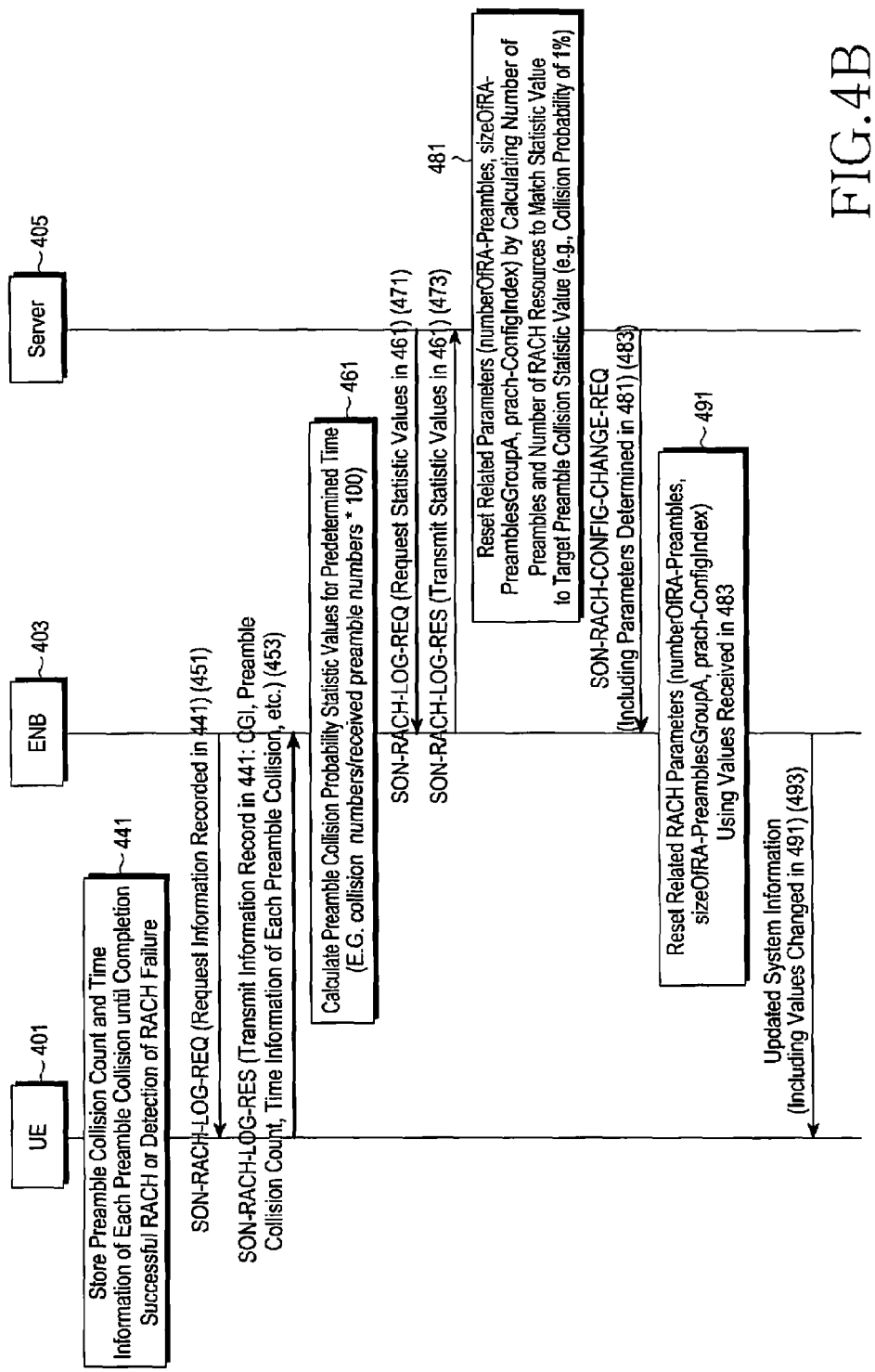

FIGS. 4A and 4B illustrate a method for automatically optimizing the number of preambles and the number of RACH resources used for contention-based RACH, according to an embodiment of the present invention.

Referring to FIG. 4, when a RACH procedure is initially started, a UE 401 stores a Cell Global ID (CGI) and initializes a preamble collision count to 0 in step 411. The UE 401 transmits a randomly selected preamble from a selected preamble group to an ENB 403 in step 413.

Upon receiving the preamble, the ENB 403 transmits preamble ID information 'Preamble id', uplink timing information 'Timing Advanced (TA)' uplink resource allocation information (UL Grant) for uplink message transmission, etc., in step 415. The resource scheduling information for the transmission of step 415 is transmitted over a Physical Downlink Control Channel (PDCCH) that uses an RA-RNTI that is specific to RACH resources.

The UE 401 receives the scheduling information for step 415 over the PDCCH using the RACH resource-specific RA-RNTI, used in step 413, determines whether or not the Preamble id of step 415 indicates the preamble transmitted in step 413, in step 421, and if so, transmits an initial L2/L3 uplink message using the uplink resources allocated in step 415, in step 423.

The message transmitted in step 423 may include unique ID information about the UE 401 (UE S-TMSI) or a random number.

After the uplink message of step 423 is transmitted, the UE 401 starts a preamble contention resolution timer.

If the UE 401 fails to receive the unique ID information or random number it transmitted in step 423, through a contention resolution message in step 425a, before the preamble contention resolution timer expires, or if the UE 401 is an RRC-connected UE and fails to receive the UE-specific scheduling information over the C-RNTI specific PDCCH that the UE 401 is maintaining in step 425b, then the UE 401 increases the preamble collision count by 1 and records time information of the preamble collision in step 431, concluding that a preamble collision has occurred.

The time information of the preamble collision may be defined as one of the preamble transmission timing of step 413, the timing at which the RACH response message was received in step 415, the timing at which the UE 401 transmitted the initial L2/L3 uplink message in step 423, and the timing at which the preamble contention resolution timer expires that detected the preamble collision. In accordance with an embodiment of the present invention, the preamble transmission timing of step 413 is assumed as the time of the preamble collision.

Until the RACH procedure is successfully completed or the RACH procedure is detected as 'failure', the UE 401 increases the preamble collision count every time the preamble collision occurs, and stores time information of each preamble collision in step 441.

The ENB 403 may request UEs in the cell to transmit at least one of the recorded/stored CGI, the preamble collision count, and each preamble collision's time information in step 451.

After receiving the request of the ENB 403 in step 451, the UE 401 transmits at least one of the CGI, the preamble collision count, and each preamble collision's time information stored in step 441, to the ENB 403 in step 453.

In an alternative embodiment, the UE 401 may transmit the CGI, the preamble collision count, and each preamble collision's time information stored in step 441 to the ENB 403, upon successful completion of the RACH procedure, without a separate request of the ENB 403. In this case, the message in step 451 is not necessary.

The ENB 403 calculates preamble collision probability statistic values for a particular time using the values received from UEs in step 461. The preamble collision probability statistic values for a particular time are calculated using the number of preambles received for the particular time and the number of preamble collisions that have occurred for the particular time.

While ('number of preamble collisions occurring for a particular time'/'number of preambles received for the particular time')*100 is described by way of example herein, any other formulae using the number of preambles received for the particular time and the number of preamble collisions occurring for the particular time may also be used.

The ENB 403 reports the preamble collision probability statistic values created in step 461 to a SON server 405 in step 473. This report may be made in response to a separate request that is received from the SON server 405 in step 471.

Upon receiving the preamble collision probability statistic value in step 473, the SON server 405 calculates the number of preambles and the number of RACH resources to match the preamble collision probability statistic value to a target preamble collision probability value (e.g., 1%), and resets the above-stated related parameters numberOfRA-Preambles, sizeOfRA-PreamblesGroupA, and parach-ConfigIndex in step 481.

If the received preamble collision probability statistic value is greater than the target preamble collision probability value, for example, if the preamble collision probability statistic value is 5% and the target preamble collision probability value is 1%, then the number of preambles or the number of RACH resources is increased to match the preamble collision probability statistic value to the target preamble collision probability value. However, if the received preamble collision probability statistic value is less than the target preamble collision probability value, for example, if the preamble collision probability statistic value is 0.1% and the target preamble collision probability value is 1%, then the number of preambles or the number of RACH resources is reduced to match the preamble collision probability statistic value to the target preamble collision probability value.

In step 483, the SON server 405 notifies the ENB 403 of the parameters numberOfRA-Preambles, sizeOfRA-PreamblesGroupA, and parach-ConfigIndex that were set/reset in step 481. The ENB 403 resets the related RACH parameters to the values notified by the SON server 405 in step 491, and notifies the reset parameters to UEs in the cell, including the UE 401, as system information, in step 493.

Although FIG. 4 illustrates that the ENB 403 generates statistic values by collecting information from UEs 401 and reports the generated statistic values to the SON server 405, and the SON server 405 determines parameters based on the statistic values and notifies the ENB 403 of the determined parameters, according to an embodiment of the present invention, the automatic adjustment operations for the parameters may also be performed in the ENB 403.

Figure 5:
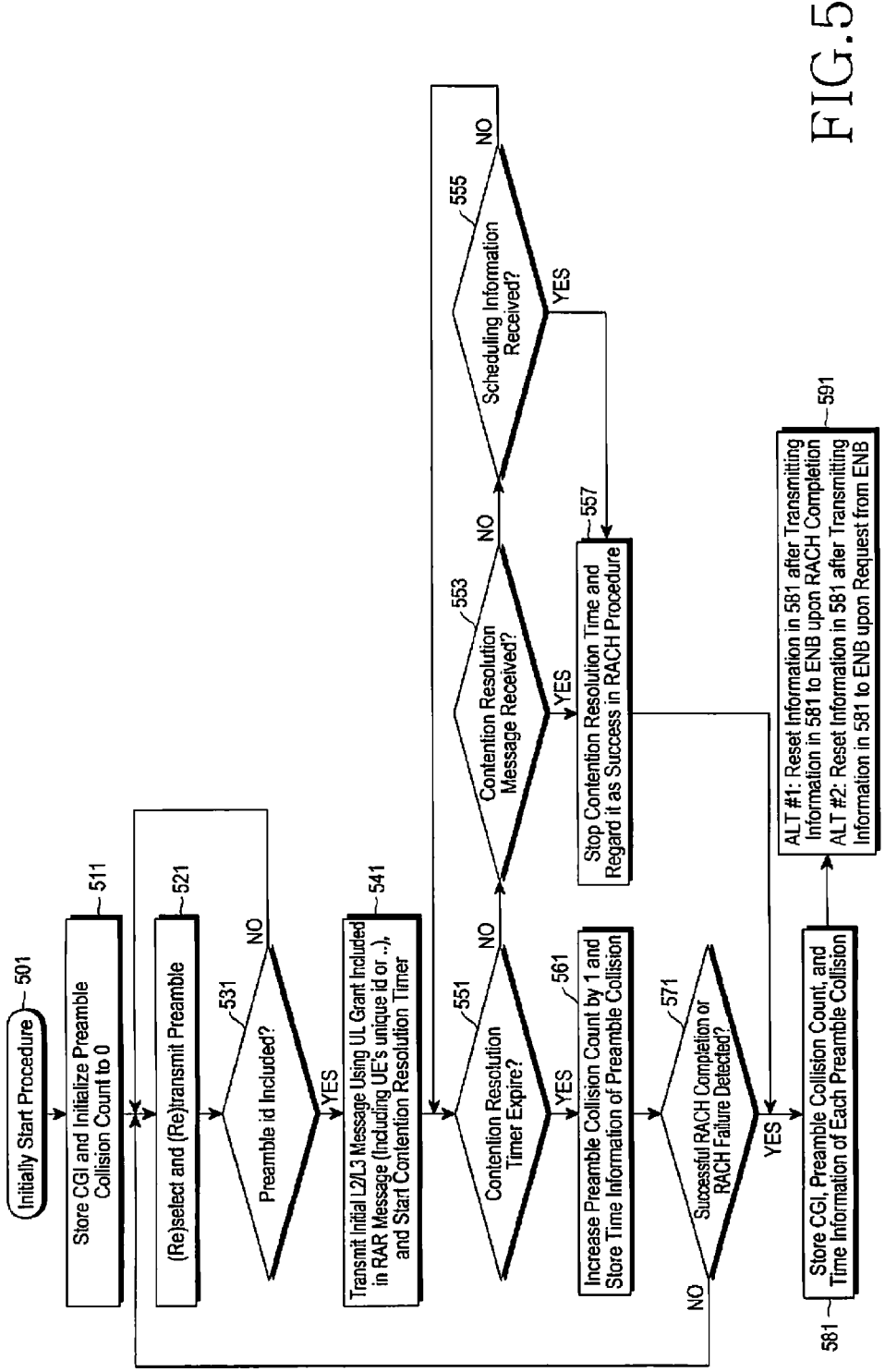
FIG. 5 is a flowchart illustrating an operation of a UE according to an embodiment of the present invention.

FIG. 5 illustrates an operation of a UE according to an embodiment of the present invention.

Referring to FIG. 5, a RACH procedure starts in step 501. In step 511, the UE stores a CGI of a cell wherein the RACH procedure is being performed, and initializes a preamble collision count to 0.

In step 521, the UE selects and transmits (or reselects and transmits) a preamble. If the UE receives scheduling information over an RA-RNTI specific PDCCH mapped to the RACH resources used in step 521 and receives a RACH response message (or a Random Access Response (RAR)) including a Preamble Id indicating the preamble transmitted in step 521, over DownLink (DL) resources indicated by the scheduling information (YES in step 531), then the UE transmits an initial L2/L3 message using UpLink (UL) resources (e.g., a UL Grant) included in the RACH response message in step 541.

The initial L2/L3 message includes the UE's unique ID (UE S-TMSI) or random number information, and upon transmitting the initial L2/L3 message, the UE starts a preamble contention resolution timer in step 541. If the Preamble Id does not indicate the preamble transmitted in step 521, in step 531 (NO in step 531), the UE performs preamble reselection and retransmission in step 521.

If the UE fails to receive a RACH contention resolution message including the UE's unique ID or random number information transmitted in step 541 (NO in step 553), before the preamble contention resolution timer expires in step 551, or if the UE is an RRC-connected UE and fails to receive UE-specific scheduling information over a C-RNTI specific PDCCH in use by the RRC-connected UE (NO in step 555), when the preamble contention resolution timer expires (YES in step 551), the UE increases the preamble collision count by 1 and stores time information of each preamble collision in step 561.

However, if the UE receives the RACH contention resolution message including the UE's unique ID or random number information transmitted in step 541 (YES in step 553), before the preamble contention resolution timer expires in step 551, or if the UE is an RRC-connected UE and receives the UE-specific scheduling information over the C-RNTI specific PDCCH in use by the RRC-connected UE (YES in step 555), the UE stops the preamble contention resolution timer and regards it as a success in the RACH procedure in step 557.

If the RACH procedure is successfully completed or a RACH procedure failure is detected (YES in step 571), the UE stores the CGI, the preamble collision count and each preamble collision's time information in step 581.

As to the CGI, preamble collision count and each preamble collision's time information of step 581, the UE may transmit the above information to the ENB and reset the information of step 581, after RACH completion (in Alternative #1), or the UE transmit may transmit the above information to the ENB and reset the information of step 581, upon receipt of a request message from the ENB (in Alternative #2), in step 591.

However, before the RACH procedure is successfully completed or the RACH procedure failure is detected (NO in step 571), the UE performs the preamble reselection and retransmission in step 521.

Figure 6:
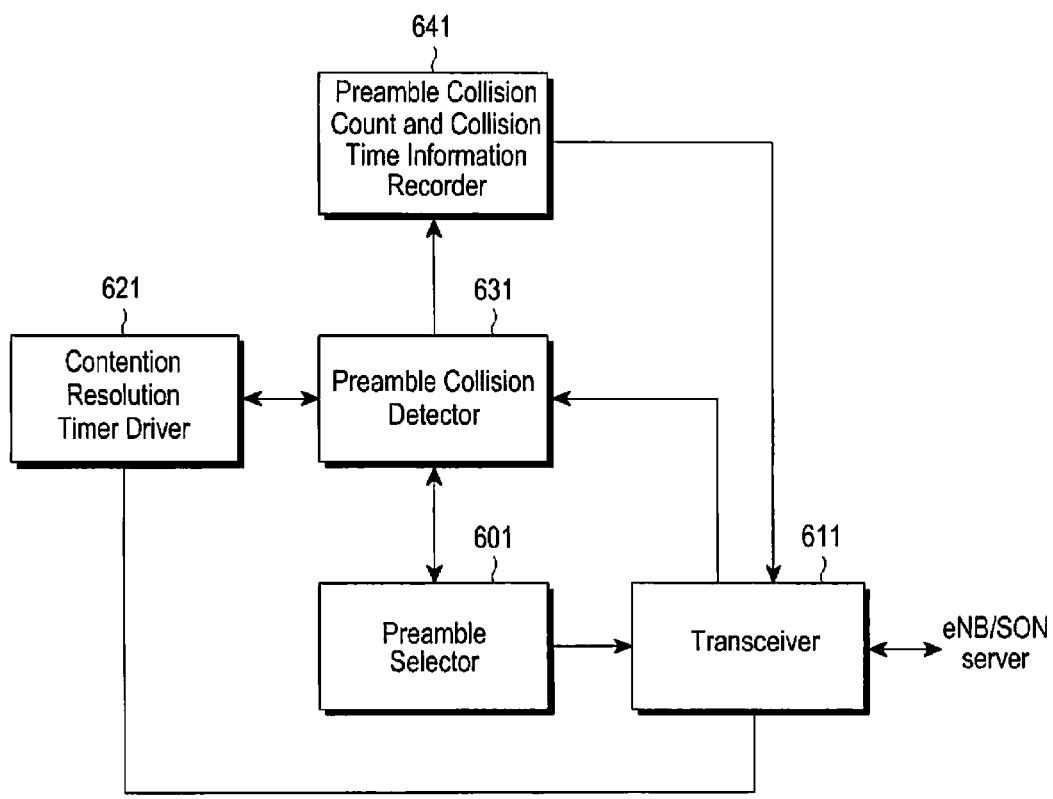
FIG. 6 is a block diagram of a UE according to an embodiment of the present invention.

FIG. 6 is a block diagram of a UE according to an embodiment of the present invention.

Referring to FIG. 6, the UE includes a preamble selector 601 for selecting a preamble and transmitting it to an ENB by way of a transceiver 611.

A preamble collision detector 631 detects a preamble collision event using a preamble contention resolution timer 621 and the RACH contention resolution message or PDCCH scheduling information received through the transceiver 611.

If a preamble collision is detected in the preamble collision detector 631, a preamble collision count and collision time information recorder 641 increases a preamble collision count and records each preamble collision's time for each CGI.

The information recorded in the preamble collision count and collision time information recorder 641 is transmitted to an ENB or a SON server through the transceiver 611, and the information is reset if the transmission is completed.

Figure 7:
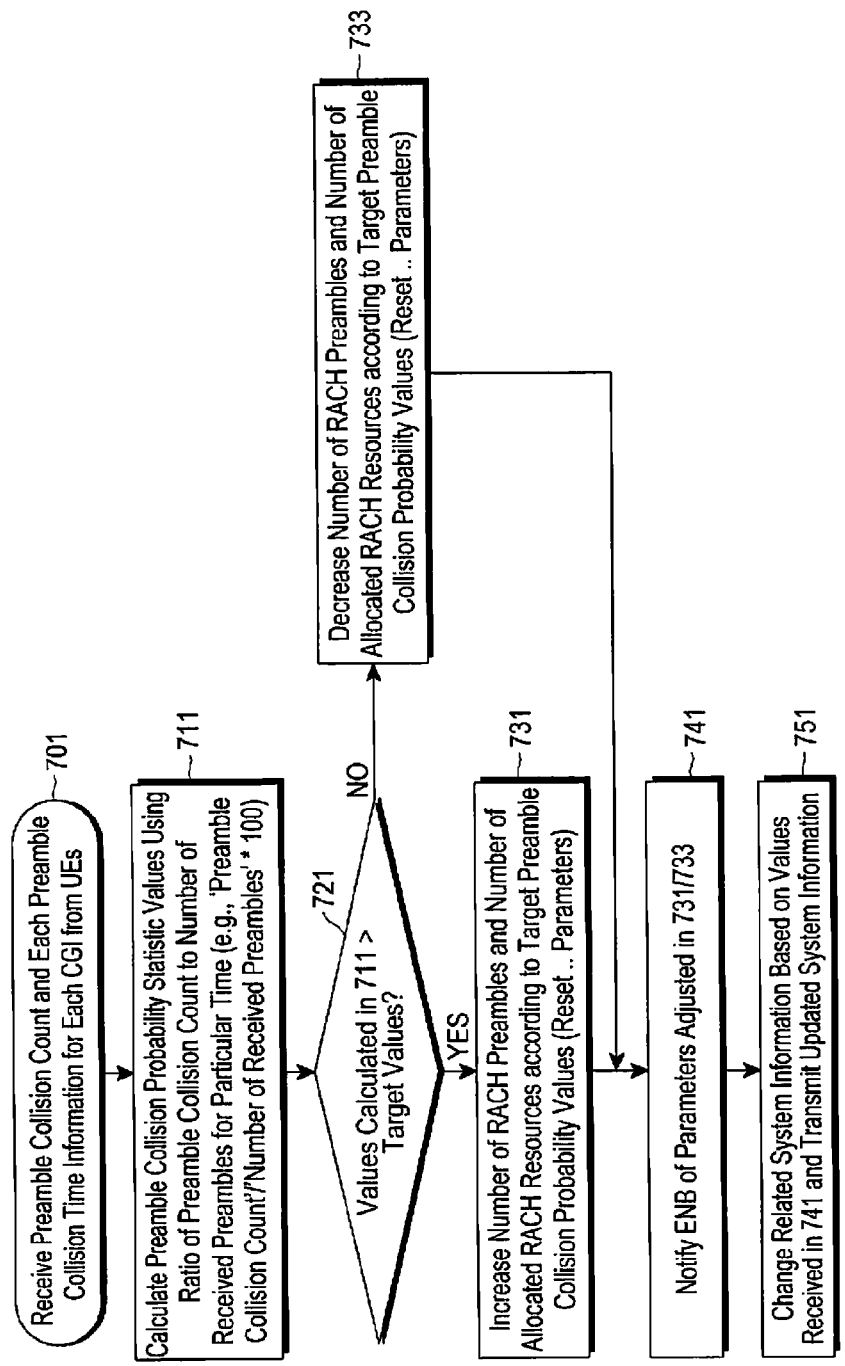
FIG. 7 is a flowchart illustrating an operation of a network according to an embodiment of the present invention.

FIG. 7 illustrates an operation of a network node according to an embodiment of the present invention.

Referring to FIG. 7, the network receives preamble collision counts and each preamble collision's time information from UEs for each CGI in step 701.

In step 711, the network calculates a preamble collision probability statistic value using a ratio of the number of preambles received for a particular time to a number of preamble collisions that have occurred for a particular time.

While ('number of preamble collisions occurring for a particular time'/'number of preambles received for the particular time')*100 is described herein by way of example, as described above, other formulae using the number of preambles received for the particular time and the number of preamble collisions occurring for the particular time may also be used.

If the preamble collision probability statistic value calculated in step 711 is greater than the target preamble collision probability value, for example, if the preamble collision probability statistic value is 5% and the target preamble collision probability value is 1% (YES in step 721), the network increases the number of RACH preambles or the number of allocated RACH resources to match the preamble collision probability statistic value to the target preamble collision probability value, and resets the related parameters numberOfRA-Preambles, sizeOfRA-PreamblesGroupA, and parach-ConfigIndex accordingly in step 731.

However, if the preamble collision probability statistic value calculated in step 711 is less than the target preamble collision probability value, for example, if the preamble collision probability statistic value is 0.1% and the target preamble collision probability value is 1% (NO in step 721), then the network reduces the number of preambles or the number of allocated RACH resources to match the preamble collision probability statistic value to the target preamble collision probability value, and resets the related parameters numberOfRA-Preambles, sizeOfRA-PreamblesGroupA, and parach-ConfigIndex accordingly in step 733.

The parameters readjusted in steps 731 and 733 are notified to a pertinent ENB in step 741. Thus, the ENB resets the related system information to the values received in step 741, and notifies the reset values to UEs in the cell as system information in step 751. While it has been described that the network sets the parameters by way of example, alternatively, the ENB itself may automatically adjust or self-adjust the parameters.

Additionally, the operations illustrated FIG. 7 may be performed in independent network nodes on a separated basis according to operator policy. For example, steps 701 to 751, except for step 741, may be performed in the ENB. While the operations of steps 721 to 741 may be performed in the SON server, the operations of steps 701, 711, and 751 may be performed in the ENB. In this case, a procedure is needed in which the ENB transmits the preamble collision probability statistic value calculated in step 711 to the SON server. Also, the operations of steps 701 to 741 may be performed in the SON server, and the operation of step 751 may be performed in the ENB.

The present invention does not preclude any of these options. Using the signal flow illustrated in FIG. 4, the ENB 403 performs steps 701, 711, and 751, and performs step 711 to transmit the statistic value to the SON server 405. The SON server 405 performs steps 721 to 741.

Figure 8:
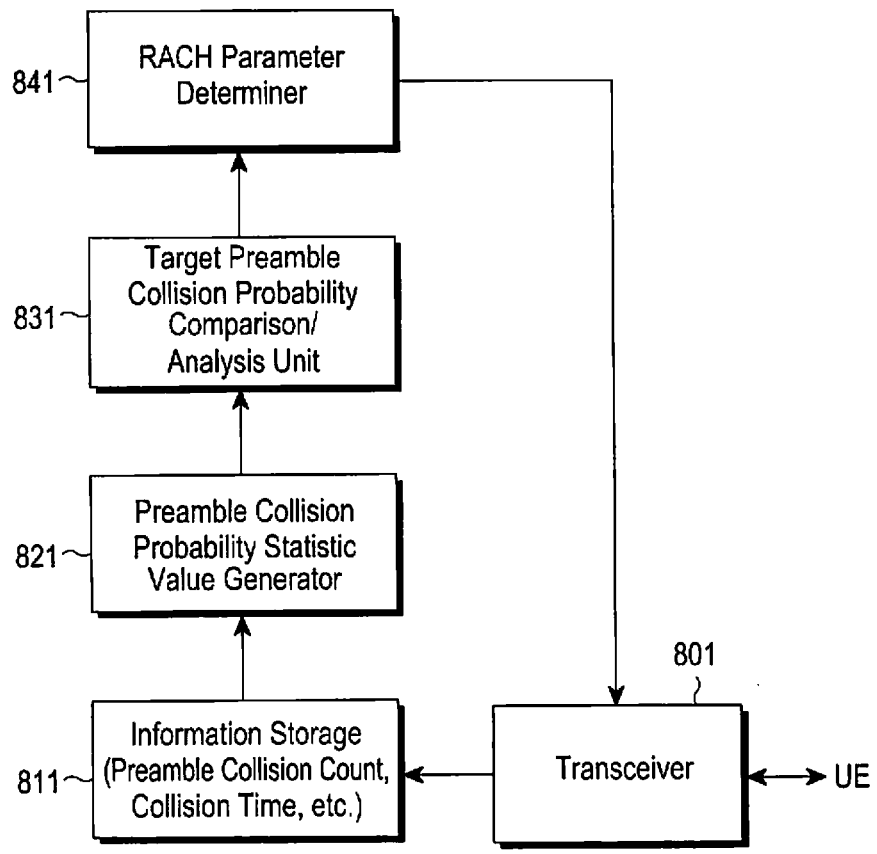
FIG. 8 is a block diagram of a network apparatus according to an embodiment of the present invention.

FIG. 8 is a block diagram illustrating a network node according to an embodiment of the present invention.

Referring to FIG. 8, the network node includes a transceiver 801 for communicating with UEs and transmitting system information in the cell.

The information collected from UEs by the transceiver 801, in accordance with an embodiment of the present invention, is stored in an information storage 811, and based on this information, a preamble collision probability statistic value generator 821 calculates preamble collision probability statistic values for a particular time.

A target preamble collision probability comparison/analysis unit 831 compares/analyzes the preamble collision probability statistic values from the preamble collision probability statistic value generator 821, with the target preamble collision probability value. A RACH parameter determiner 841 determines the number of preambles or the number of allocated RACH resources to be used for contention-based RACH, based on the results from the target preamble collision probability comparison/analysis unit 831. The RACH parameter determiner 841 resets the related parameters numberOfRA-Preambles, sizeOfRA-PreamblesGroupA, and parach-ConfigIndex. The reset RACH parameters are notified to UEs in the cell through the transceiver 801.

The operation of FIG. 8 may be performed in independent network nodes on a separated basis according to operator policy. For example, all of the operations of the entities 801 to 841 may be performed in an ENB.

While operations of the target preamble collision probability comparison/analysis unit 831 and the RACH parameter determiner 841 may be performed in a SON server, operations of the transceiver 801, the information storage 811, and the preamble collision probability statistic value generator 821 may be performed in the ENB. In this case, a separate block is used, in which the ENB transmits the preamble collision probability statistic value calculated by the preamble collision probability statistic value generator 821, to the SON server.

Additionally, operations of the entities the information storage 811, the preamble collision probability statistic value generator 821, the target preamble collision probability comparison/analysis unit 831, and the RACH parameter determiner 841 may be performed in the SON server, and the operation of the transceiver 801 may be performed in the ENB.

As is apparent from the foregoing description, the various embodiments of the present invention can efficiently allocate system resources regarding the random access procedure in the mobile communication system, contributing to an increase in random access capacity.

In particular, RACH parameters are set considering RACH collisions, thereby providing a more accurate optimized random access procedure.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A Random Access CHannel (RACH) management method performed by a User Equipment (UE) in a mobile communication system, comprising:
   determining successful completion of a RACH procedure when a contention resolution is received before a contention resolution timer expires;
   receiving a UE information transmit request from a network, upon the successful completion of the RACH procedure; and
   transmitting, to the network, a message including contention information of the completed RACH procedure, in response to the UE information transmit request.

2. The RACH management method of claim 1, wherein the RACH procedure is a most-recently completed RACH procedure and the message includes information indicating the contention that is detected in at least one preamble transmitted for the most-recently completed RACH procedure.

3. The RACH management method of claim 1, further comprising storing the information indicating the contention until the RACH procedure is successfully performed or until the RACH procedure fails.

4. The RACH management method of claim 3, wherein the information indicating the contention includes at least one of a cell global identity, a number of preamble collisions, and time information for each preamble collision.

5. The RACH management method of claim 4, wherein the preamble collision's time information includes at least one of a preamble transmission timing and a timing at which a preamble contention resolution timer for detecting a preamble collision expires.

6. A method for managing a Random Access CHannel (RACH) by a network in a mobile communication system, comprising:
   determining successful completion of a RACH procedure when a contention resolution is received before a contention resolution timer expires;
   transmitting a User Equipment (UE) information transmit request, to a UE, upon the successful completion of the RACH procedure; and
   receiving, from the UE, a message including contention information of the completed RACH procedure, in response to the UE information transmit request.

7. The method of claim 6, further comprising:
   sensing an increase in contentions from the message including the information indicating the contention; and
   increasing resource allocation to the UE.

8. The method of claim 6, wherein the RACH procedure is a most-recently completed RACH procedure and the message includes information indicating the contention that is detected in at least one preamble transmitted for the most-recently completed RACH procedure.

9. The method of claim 6, wherein the information indicating the contention is stored until the UE successfully performs the RACH procedure or until the RACH procedure fails.

10. The method of claim 9, wherein the information indicating the contention includes at least one of a cell global identity, a number of preamble collisions, and time information for each preamble collision.

11. The method of claim 10, wherein the preamble collision's time information includes at least one of a preamble transmission timing and a timing at which a preamble contention resolution timer for detecting a preamble collision expires.

12. A User Equipment (UE) apparatus using a Random Access CHannel (RACH) in a mobile communication system, comprising:
   a receiver for determining successful completion of a RACH procedure when a contention resolution is received before a contention resolution timer expires, and receiving a UE information transmit request from a network, upon the successful completion of the RACH procedure; and
   a transmitter for transmitting, to the network, a message including contention information of the completed RACH procedure, in response to the UE information transmit request.

13. The UE apparatus of claim 12, wherein the RACH procedure is a most-recently completed RACH procedure and the message includes information indicating the contention that is detected in at least one preamble transmitted for the most-recently completed RACH procedure.

14. The UE apparatus of claim 12, further comprising a controller for storing the information indicating the contention until the RACH procedure is successfully performed or until the RACH procedure fails.

15. The UE apparatus of claim 14, wherein the information indicating the contention includes at least one of a cell global identity, a number of preamble collisions, and time information for each preamble collision.

16. The UE apparatus of claim 15, wherein the preamble collision's time information includes at least one of a preamble transmission timing and a timing at which a preamble contention resolution timer for detecting a preamble collision expires.

17. A network apparatus for managing a Random Access CHannel (RACH) in a mobile communication system, comprising:
   a receiver for determining successful completion of a RACH procedure when a contention resolution is received before a contention resolution timer expires;
   a transmitter for transmitting a User Equipment (UE) information transmit request, to a UE, upon the successful completion of the RACH procedure; and
   a receiver for receiving, from the UE, a message including contention information of the completed RACH procedure, in response to the UE information transmit request.

18. The network apparatus of claim 17, further comprising a controller for sensing an increase in contentions from the received message including the information indicating the contention and increasing resource allocation to the UE.

19. The network apparatus of claim 17, wherein the RACH procedure is a most-recently completed RACH procedure and the message includes information indicating the contention that is detected in at least one preamble transmitted for the most-recently completed RACH procedure.

20. The network apparatus of claim 17, wherein the information indicating the contention is stored until the UE successfully performs the RACH procedure or until the RACH procedure fails.

21. The network apparatus of claim 20, wherein the information indicating the contention includes at least one of a cell global identity, a number of preamble collisions, and time information for each preamble collision.

22. The network apparatus of claim 21, wherein the preamble collision's time information includes at least one of a preamble transmission timing and a timing at which a preamble contention resolution timer for detecting a preamble collision expires.

* * * * *